United States Patent [19]

Menown et al.

[11] Patent Number: 4,907,243
[45] Date of Patent: Mar. 6, 1990

[54] LASER APPARATUS

[75] Inventors: Hugh Menown, Writtle; Arthur Maitland, St. Andrews; Graeme L. Clark, Chelmsford, all of United Kingdom

[73] Assignee: English Electric Valve Company, Ltd., Chelmsford, United Kingdom

[21] Appl. No.: 374,923

[22] Filed: Jul. 3, 1989

Related U.S. Application Data

[63] Continuation of Ser. No. 123,254, Nov. 20, 1987, abandoned.

[30] Foreign Application Priority Data

Nov. 21, 1986 [GB] United Kingdom ............... 8627928

[51] Int. Cl.⁴ .............................................. H01S 3/08
[52] U.S. Cl. ......................................... 372/95; 372/33
[58] Field of Search .................. 372/95, 56, 59–61, 372/33, 34

[56] References Cited

U.S. PATENT DOCUMENTS

| | | | |
|---|---|---|---|
| 3,614,658 | 10/1971 | Goldsborough | 372/61 |
| 3,694,767 | 9/1972 | Klein et al. | 372/56 |
| 3,721,916 | 3/1973 | Witte et al. | 372/61 |
| 3,863,178 | 1/1975 | Ferrar | 372/56 |
| 4,065,731 | 12/1977 | Wang | 372/61 |
| 4,224,579 | 9/1980 | Marlett et al. | 372/61 |
| 4,229,711 | 10/1980 | Schimitschek et al. | 372/56 |
| 4,232,274 | 11/1980 | Tokudome et al. | 372/56 |
| 4,249,143 | 2/1981 | Eden | 372/56 |
| 4,347,613 | 8/1982 | Pivirotto | 372/59 |
| 4,794,612 | 12/1988 | Fuke | 372/56 |

FOREIGN PATENT DOCUMENTS 2904409 8/1979 Fed. Rep. of Germany ........ 372/59

Primary Examiner—Frank Gonzalez
Attorney, Agent, or Firm—Spencer & Frank

[57] ABSTRACT

Laser apparatus includes hydrogen or deuterium buffer gas and dispenser reservoirs which contain a hydride or deuteride as appropriate. As gas molecules from the buffer gas are lost within the discharge tube due to trapping and sputtering processes, hydrogen or deuterium is given off from the surfaces of the reservoirs at a greater rate to maintain the vapor pressure within the discharge tube at a substantially constant level. Thus the laser apparatus may operate in a "sealed-off" mode, that is without requiring that buffer gas be flowed through it.

18 Claims, 1 Drawing Sheet

LASER APPARATUS

This application is a continuation of application Ser. No. 07/123,254 filed Nov. 20th 1987, now abandoned.

BACKGROUND OF THE INVENTION

This invention relates to laser apparatus and more particularly, but not exclusively, to metal vapour lasers.

Laser apparatus generally requires that, in addition to the material which is, or is to form, the laser active medium, a buffer gas is included in the discharge tube to enable sufficient gas pressure to be maintained for laser action to be possible. Typically, the buffer gas must be continuously pumped through the discharge tube so that contaminants are removed and gas pressure maintained against losses. The apparatus required to ensure that sufficient gas flows through the discharge tube is relatively complex and physically bulky, requiring external pumps, pipes and valves.

SUMMARY OF THE INVENTION

The present invention seeks to provide improved laser apparatus.

According to the invention, there is provided laser apparatus comprising a laser discharge tube containing hydrogen and/or deuterium buffer gas and a dispenser reservoir arranged such that in operation there is dynamic equilibrium between material of the reservoir and the buffer gas whereby buffer gas is replenished from the reservoir. Apparatus in accordance with the invention enables "sealed-off" operation to be achieved, that is, apparatus in which no flow-through of buffer gas is required since compensation may be made for gas losses suffered due to sputtering processes and trapping within the discharge tube by use of the reservoir. Thus, the laser apparatus may be made particularly compact and simple to operate because the need for external pumps, pipes and valves is avoided. It is also believed that by employing the invention, population inversion properties may be improved. The invention is particularly advantageously employed where the laser active medium is a metal vapour, such as copper or gold, because trapping is a significant process in such cases. Previously, it had not been considered desirable to use hydrogen or deuterium as a buffer gas within a laser discharge tube since these gases require pumping with higher power levels to achieve laser operation than is the case with neon, for example. With apparatus in accordance with the invention, this power into the buffer gas remains within the discharge tube to heat it.

In practice, the desired pressure of the buffer gas is obtained by heating the material of the reservoir to a particular temperature to adjust the dynamic equilibrium. The surface of the material may be arranged to be open to the gas within the tube or the material could be wholly enclosed by a container, such as a thin-walled titanium vessel, through which gas molecules may pass, dynamic equilibrium thus being substantially unaffected by its presence. Most conveniently the pressure within the tube is arranged to be maintained substantially constant. It is preferred that the pressure of the buffer gas is low, being less than 1 torr, enabling the laser to be operated in a condition as represented on the left hand side of the Paschen curve.

In an advantageous embodiment of the invention the dispenser reservoir comprises a container surrounding the material of the reservoir and means are included for passing a heating current through the container wall to maintain the material of the reservoir at a desired operating temperature. Alternatively, a heater may be located within the material of the reservoir to attain the operating temperature, and hence the required pressure within the tube. Where hydrogen is a buffer gas, the dispenser reservoir preferably includes a hydride, titanium hydride being particularly suitable, or, where deuterium is the buffer gas, a deutride or a mixture of these may be used if a mixture of buffer gases is employed.

BRIEF DESCRIPTION OF THE DRAWINGS

Some ways in which the invention may be performed are now described by way of example with reference to the accompany drawings, in which.

DETAILED DESCRIPTION OF THE PREFERRED EMBODIMENTS

Figure 1:
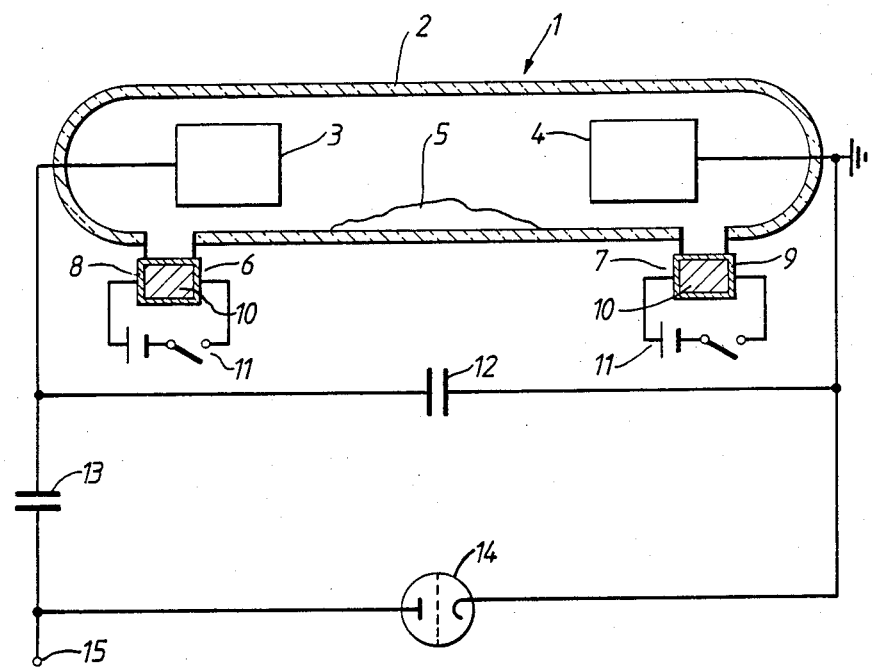
FIG. 1 schematically illustrates laser apparatus in accordance with the invention.

With reference to FIG. 1, laser apparatus includes a laser discharge tube 1 which comprises a generally cylindrical quartz envelope 2 containing hydrogen buffer gas at a pressure of less than 1 torr, two electrodes 3 and 4 located at each end of the tube and copper metal pieces 5. In this embodiment of the invention, two dispenser reservoirs 6 and 7 are included, being located at respective ends of the tube 1. The reservoirs 6 and 7 comprise thin-walled titanium containers 8 and 9 respectively, which hold powdered titanium hydride 10. The containers 8 and 9 are connected in circuits 11 to provide a heating current through their walls.

The electrodes 3 and 4 are connected in parallel with a capacitor 12. A second capacitor 13 is included within the circuit, being connected in parallel with the first capacitor 12 but being isolated therefrom by a switch 14.

During operation of the laser apparatus, a large potential is applied at a terminal 15 to cause the second capacitor 13 to become charged. When charging is complete, the switch 14 is closed and the charge is transferred to the first capacitor 12. The voltage produced across the plates of the capacitor 12, and thus the electrodes 3 and 4 within the discharge tube 1, is sufficient to cause breakdown of the gas within the tube 1. The discharge established within the envelope 2 between the electrodes 3 and 4 causes the copper 5 to become heated and to vaporise, forming the laser active medium. Laser action occurs when sufficient vapour pressure is achieved, typically at about 0.5 to 1.0 torr.

When it is desired to operate the laser, the titanium hydride 10 of the dispenser reservoirs 6 and 7 is heated by means of the circuits 11 to a desired operating temperature, to set a chosen gas pressure within the tube 1. The structure of the titanium wall of the containers 8 and 9 is sufficiently open to allow substantially free passage through it to hydrogen molecules from the buffer gas and given off from the titanium hydride 10 when it is heated. Monitoring means may be included to determine the temperature of the titanium hydride 10 or the average pressure within the tube 1, and the heating current is controlled accordingly to maintain the pressure at the desired value.

As laser operation continues, metal condenses from the vapour onto the inner surface of the envelope 2, causing gas molecules to become trapped at the surface, and hence vapour pressure within the envelope 2 is reduced. This is compensated for by an increased rate of evaporation of hydrogen from the surfaces of the reservoirs 6 and 7. Thus the desired vapour pressure is maintained and laser action may continue.

Figure 2:
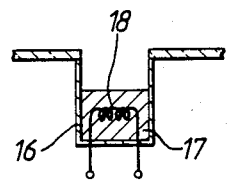
FIG. 2 shows part of another apparatus in accordance with the invention.

With reference to FIG. 2, in another embodiment of the invention, a plurality of deuterium buffer gas reservoirs 16 are provided for laser apparatus which employs deuterium buffer gas, one of which is illustrated in FIG. 2. In this case, the material of the reservoir is tightly packed titanium deuteride 17, the surface of which is left open to the gas atmosphere within the laser discharge tube. Heating of the titanium deuteride 17 is accomplished by including a heater coil 18 within the material itself.

We claim:

1. A laser of the type having a laser discharge tube containing a mixture of gases including a laser active medium, in which a discharge is supplied in the laser active medium to enable the stimulated emission of coherent radiation, comprising: the mixture of gases includes a buffer gas comprising hydrogen or deuterium; a dispenser reservoir in communication with the laser discharge tube, and a supply of material including a hydride or deuteride, contained within said dispenser reservoir which is in communication with the laser active medium in the laser discharge tube, for supplying hydrogen or deuterium gas during operation to the laser discharge tube, the gas supplied from said dispenser reservoir being of the same composition as said buffer gas and having substantially free passage between the reservoir material and the laser discharge tube, whereby said buffer gas is replenished from the supply of material in said dispenser reservoir.

2. A laser as claimed in claim 1 wherein during operation, said buffer gas is at a pressure within said laser discharge tube, and said pressure is maintained at a substantially constant value.

3. A laser as claimed in claim 2, wherein said pressure of said buffer gas has a value which is less than 1 torr.

4. A laser as claimed in claim 1 wherein said laser active medium of said laser discharge tube is a metal vapour.

5. A laser as claimed in claim 1 wherein said dispenser reservoir comprises a container surrounding said supply of material; and heating means passing an electric current through a wall of said container, whereby supply of material can be heated to a selected operating temperature.

6. A laser as claimed in claim 5 wherein said laser active medium of said laser discharge tube is a metal vapour.

7. A laser as claimed in claim 6 wherein said pressure of said buffer gas has a value which is less than 1 torr.

8. A laser as claimed in claim 1, further comprising heating means, said heating means being disposed within said dispenser reservoir, whereby said supply of material can be heated to a selected operating temperature.

9. A laser as claimed in claim 8 wherein said laser active medium of said laser discharge tube is a metal vapour.

10. A laser as claimed in claim 9 wherein said pressure of said buffer gas is less than 1 torr.

11. A laser apparatus as claimed in claim 1, wherein said dispenser reservoir comprises a thin walled vessel through which can pass said gas supplied by said dispenser reservoir.

12. A laser apparatus as claimed in claim 11, wherein said thin walled vessel has at least one wall composed of titanium, and the gas supplied from said supply of material passes through said at least one wall.

13. A laser apparatus as claimed in claim 12, wherein said buffer gas is hydrogen, and said supply of material in said dispenser reservoir includes a hydride.

14. A laser apparatus as claimed in claim 12, wherein said buffer gas is deuterium, and said supply of material in said dispenser reservoir includes a deuteride.

15. A laser apparatus as claimed in claim 12, wherein said dispenser reservoir comprises a container surrounding said supply of material; and heating means passing an electric current through a wall of said container, whereby said supply of material can be heated to a selected operating temperature.

16. A laser apparatus as claimed in claim 12, wherein said laser active medium of said laser discharge tube is a metal vapour.

17. A laser apparatus as claimed in claim 12, wherein said pressure of said buffer gas has a value which is less than 1 torr.

18. A laser apparatus as claimed in claim 12, further comprising heating means, said heating means being disposed within said dispenser reservoir, whereby said supply of material can be heated to a selected operating temperature to cause said supply of material to produce gas through said at least one wall of said thin walled vessel at a pressure sufficient to be in equilibrium with said mixture of gases in said laser discharge tube.

* * * * *